United States Patent [19]
Stirling

[11] Patent Number: 5,829,233
[45] Date of Patent: Nov. 3, 1998

[54] BALE WAGON APPARATUS

[76] Inventor: William Stirling, 202-Highway 8, Merritt, British Columbia, Canada, V1K 1N7

[21] Appl. No.: 932,365

[22] Filed: Sep. 17, 1997

[51] Int. Cl.$^6$ ........................................................ B65B 9/10
[52] U.S. Cl. .............................................. 53/567; 53/576
[58] Field of Search .............................. 53/255, 257, 260, 53/258, 527, 529, 530, 567, 576; 100/65, 66, 100, 144, 145, 148; 141/71, 73, 74, 114, 231, 313, 314, 317

[56] References Cited

U.S. PATENT DOCUMENTS

| | | |
|---|---|---|
| 4,594,836 | 6/1986 | Good . |
| 4,606,176 | 8/1986 | Cundall . |
| 4,686,817 | 8/1987 | Brodrecht et al. . |
| 4,888,937 | 12/1989 | Glenn . |
| 4,938,006 | 7/1990 | Korsgaard ............................. 53/567 X |
| 4,945,715 | 8/1990 | Brodrecht ................................. 53/567 |
| 5,003,754 | 4/1991 | Stirling ................................. 53/567 X |
| 5,016,424 | 5/1991 | Stirling ................................. 53/567 X |
| 5,220,772 | 6/1993 | Koskela et al. ....................... 53/567 X |
| 5,323,591 | 6/1994 | Inman et al. .......................... 53/567 X |
| 5,385,002 | 1/1995 | Cundall ................................. 53/567 X |
| 5,398,487 | 3/1995 | Inman et al. .............................. 53/567 |
| 5,421,144 | 6/1995 | Inman et al. .......................... 53/567 X |
| 5,425,221 | 6/1995 | Pronovost et al. ....................... 53/567 |
| 5,465,559 | 11/1995 | Heiner et al. ............................ 53/567 |
| 5,469,693 | 11/1995 | Brodrecht ................................. 53/567 |
| 5,619,842 | 4/1997 | Brubaker et al. ..................... 53/529 X |
| 5,628,168 | 5/1997 | Inman et al. .............................. 53/567 |
| 5,692,363 | 12/1997 | Inman et al. .............................. 53/567 |

FOREIGN PATENT DOCUMENTS

| | | |
|---|---|---|
| 1302959 | 6/1992 | Canada . |
| 1302989 | 6/1992 | Canada . |
| 2 136 761 | 9/1984 | United Kingdom . |
| WO 84/02116 | 6/1984 | WIPO . |

*Primary Examiner*—Daniel B. Moon

[57] ABSTRACT

An apparatus for loading bales of agricultural products into a protective sheath. The apparatus includes a mobile framework adaptable at one end for connection with a vehicle. A detachable bale bagger is received at an end opposite the vehicle and supports a corrugation of protective sheath. In an attached mode, the apparatus is adaptable to retrieve, transport, handle and sheath bales of agricultural products. A lifting unit is adapted to retrieve bales from a location and mount them in an end-to-end fashion along parallel rails of the mobile framework. As bales are individually retrieved and loaded, a bale moving device movably connected to the mobile framework, rearwardly displaces the incoming bales a distance along parallel rails so as to make space for the next bale. Once the mobile framework is loaded with bales, the apparatus is transported to a location suitable for storage. Located at a storage site, a bale bagger is oriented in a stationary engaging position for connection with the mobile framework and includes an open-ended drum supporting a corrugation of protective sheath. The mobile framework, containing a plurality of bales, approaches the stationary bale bagger in a reverse orientation such that a first and a second attachment unit respectively located thereon, are aligned for connection. In the attached mode, the bale moving device is adapted to move the plurality of bales rearwardly along the mobile framework and through the open-ended drum of the bale bagger. Simultaneous with the rearward displacement of the bales, the vehicle pulls the apparatus forwardly such that the corrugation of protective sheath can be extended a distance to receive the incoming bale as it is passed through the open-ended drum. The bale bagger is attachable to the mobile framework such that it can be secured in an upright position and safely transported a distance when the framework is in operable connection with a vehicle.

13 Claims, 6 Drawing Sheets

BALE WAGON APPARATUS

The present invention relates to an apparatus and method for retrieving, transporting, handling and sheathing bales of agricultural products. The resulting apparatus and method yield a high quality forage.

BACKGROUND OF THE INVENTION

Products of agriculture are routinely processed into bales for the purposes of transportation and storage. The size and density of such bales result in their difficulty to be manually transported, packaged and stored. The nature of agricultural products require that they be stored under controlled conditions to achieve a high quality forage essential for successful and efficient agricultural practice. Traditionally, agricultural products are stored in silos to under go the fermentation processes necessary for high quality forage production. This method requires extensive transport and maneuvering, as well as difficult stacking and retrieving procedures.

The use of plastic tubing has rapidly transpired as a superior sheath for bales of agricultural products for the purposes of protection and storage. Such sheathing provides a resilient weather barrier, while under strict packaging provisions an essentially anaerobic environment for the production of highly nutritious forage can be maintained. In addition to its protective capacity, this highly versatile sheathing material reduces the requirement of extensive transportation and storage facilities, while eliminating the difficulty of extensive maneuvering. As a result, the capital and labour costs of such an agricultural practice can be reduced.

Conventionally, a tractor with a front-end loading means would be required to retrieve bales from the fields to be loaded onto a nearby transporting platform such as a wagon. Alternatively, the use of bale handling and processing equipment is known in the field. The freshly baled product would be drawn to a region suitable for plastic tube storage. In the presence of a sheathing device, a tractor attached with a bale handling apparatus would proceed to introduce the bales, one by one, from the transporting platform, into the framework housing the protective sheath. After each bale is received by the sheathing device, an engagement would be employed to allow the framework to be drawn forward so as to extend the plastic tubing a distance sufficient to deposit another bale.

Practices of sheathing bales currently require the use of more than one piece of farm machinery. In addition to a conventional tractor with a front-end loader and a bagging apparatus, such practices require the use of a wagon or flat-bed truck for transporting the bales to a suitable storage area. Applicants' earlier Canadian Patent No. 1,302,989 issued on Jun. 9, 1992 describes a temporarily immobile sheathing device with a framework for receiving a bale to be introduced into an extending plastic tube. This procedure employs a bale bagging device for retaining a plastic tube in an open position for receiving bales, a tractor attached with a bale handling device to load and unload a wagon, and for introducing bales from a wagon into the bale bagging device and having means for attaching to the bale bagging device and pulling the device forward so as to extend the plastic tube.

Similarly, U.S. Pat. No. 4,594,836 issued Jun. 17, 1986 to Maynard L. Good, teaches a transportable bagging apparatus for receiving and sequentially loading individual bales of agricultural product into a plastic tubing. Each bale is loaded from a location adjacent the side rails of the base frame of the apparatus by a front-end loader or a fork-type bale carrier. The apparatus employs a hydraulically driven carriage to force an engaged bale through a drum and into the plastic tubing contained at the opposite end. In this manner, the process of retrieving each bale from a flat-bed or truck, side loading the same onto the frame of the apparatus and subsequently depositing into plastic tubing, is repeated for each bale. In addition to functioning in association with a front-end loader or the like, the apparatus therein disclosed functions in connection with a tractor which pulls the frame forward while the carriage exerts rearward pressure on the bale so as to deposit the bale in plastic tubing. Although automated to some extent, the apparatus taught in U.S. Pat. No. 4,594,836 works in association with a plurality of machinery thereby serving to be a laborious and mechanically intensive process.

Despite claims of energy, material and man-hour efficiency the above methods of sheathing agricultural bales require a plurality of equipment to achieve the claimed result. Specifically, the above mentioned methods at least require a tractor with a bale handling means, a bale transporting means such as a wagon in connection with a tractor or a flat-bed truck, and an apparatus to accept bales and subsequently introduce such bales into a tubing while in connection with a vehicle for extending the tubing a distance to accept the bales. As a result such methods are laborious, inefficient and expensive.

Some apparatuses are currently known for automatically depositing bales into plastic tubes by conveyor means or tiltable support structures. These methods have proven to exert excessive pressure and stress on the bales, tearing the twine and causing the bales to unravel during the process. Maintenance of freshly cut forage in a tightly baled form is essential to achieving the level of moisture necessary to achieve a high quality agricultural product. Specifically, it is necessary that freshly cut forage attain a controlled moisture content (preferably of 35–40%) and be subject to an anaerobic environment preferably within 24 hours of harvest.

For the most part, the above mentioned methods can be successfully achieved by a single operator although the time to air-tight storage can be lengthy. In this regard, it would seem beneficial to employ a procedure that would allow for a more functional method of retrieving, handling, transporting and packaging baled forage. Specifically, to be able to reduce the time to storage, alleviate the labour intensity, and limit the equipment maintenance currently required, while maximizing the return of a high quality product.

SUMMARY OF THE INVENTION

An object of the present invention is to provide a mobile apparatus suitable for use by a single operator, for retrieving, handling, transporting and packaging a plurality of bales of agricultural product that will improve the ease and efficiency whereby bales are stored in a protective sheath.

A further object of the present invention is to provide a method whereby baled forage can be efficiently retrieved, handled, transported and packaged using a single unit of machinery requiring a single operator, thereby providing an economically efficient alternative to methods currently available.

A further object of the present invention is to provide a method whereby baled forage can be efficiently retrieved, handled, transported and packaged by a single operator in good time so as to improve the quality of the resulting agricultural product.

In accordance with one aspect of the present invention there is provided an apparatus for loading bales of agricultural products into a protective sheath; said apparatus comprising: (i) a mobile framework for supporting a plurality of agricultural bales including: (a) a lifting means for loading bales onto said mobile framework; (b) a bale moving means movably connected to a pair of parallel rails on said mobile framework; and (c) a first attachment means; and (ii) a bale bagger comprising: (a) an open-ended drum adapted to support a corrugated protective sheath along its circumference; (b) a frame adapted to support said open-ended drum including a ground engaging means for holding said bale bagger in an engaging position; and (c) a second attachment means compatible with the first attachment means; wherein said mobile framework is adapted at one end for connection with a vehicle and at the opposite end for connection with said bale bagger; and said first and second attachment means connect said mobile framework with said bale bagger; said bale moving means being adapted to move the bales rearwardly along said mobile framework and through said open-ended drum; wherein said bales are displaced rearwardly along the mobile framework simultaneously with the vehicle moving the apparatus forwardly thereby extending said corrugated protective sheath a distance to receive the agricultural bales as they pass through the open-ended drum.

In accordance with another aspect of the present invention there is provided a method of loading bales of agricultural products into a protective sheath; wherein said method requires the use of an apparatus in connection with a vehicle, said method comprising: (a) retrieving a plurality of bales of agricultural product and loading said bales onto a mobile framework; (b) transporting said mobile framework containing said plurality of bales to a location suitable for storage of said plurality of bales; (c) connecting said mobile framework to a bale bagger wherein said bale bagger is positioned so as to allow said mobile framework to attach thereto; said bale bagger including an open-ended drum adapted to support a corrugated protective sheath along its circumference; (d) displacing said bales rearwardly along said mobile framework and through said open-ended drum; (e) moving said vehicle forward as each bale is introduced into the open-ended drum so as to extend the corrugated protective sheath a distance sufficient to accept the incoming bale; and (f) detaching said mobile framework from said bale bagger.

INTRODUCTION TO THE DRAWINGS

The present invention will be described in detail hereinbelow with the aid of the accompanying drawings, in which.

DETAILED DESCRIPTION

Figure 1:
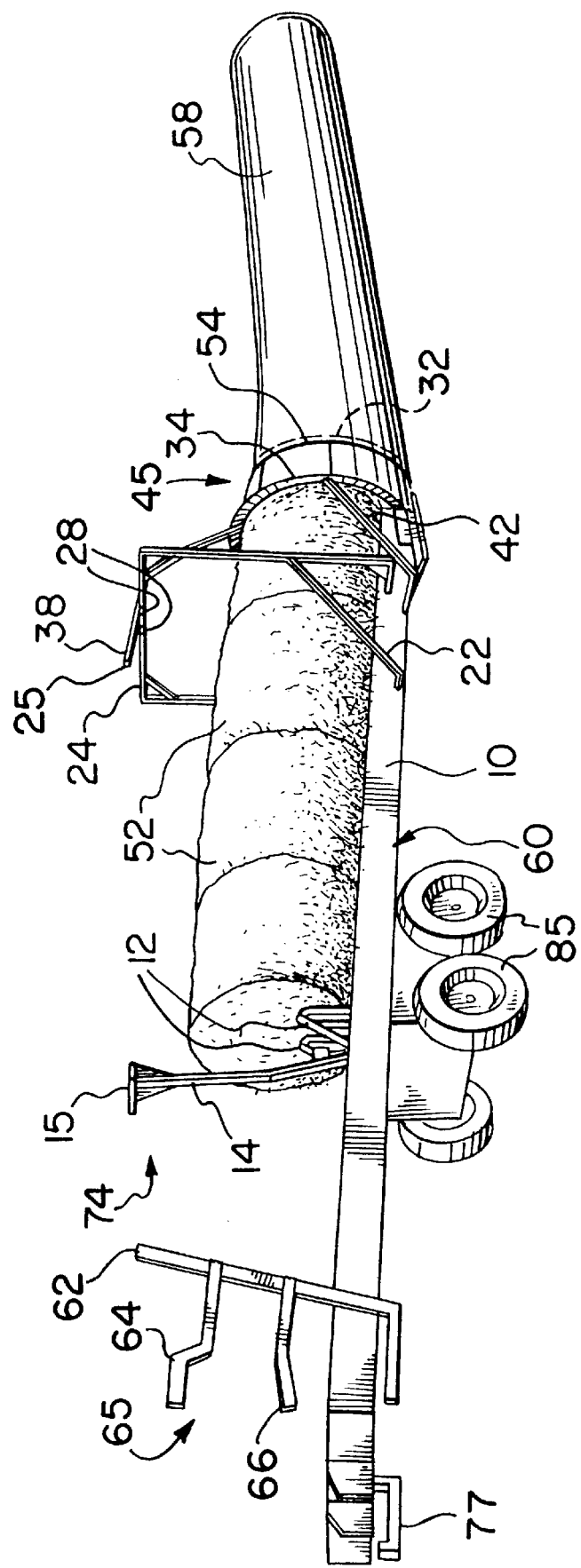
FIG. 1 is a side perspective overview of the present invention in operation with a plurality of bales.

As illustrated in FIG. 1, a bale wagon apparatus 74 includes a mobile framework 60 comprised of a horizontal frame means mounted on rotating members 85, including parallel rails 10 adjoined at opposite ends by cross members 26 (FIG. 7), a bale lifting means 65 anteriorly located along one of the parallel rails 10 and a bale bagger 45 posteriorly attached thereto. Bale wagon apparatus 74 functions in connection with a vehicle at a hitching unit 77. It is preferred but not essential that apparatus 74 is in tiltable connection with the vehicle. In connection with a vehicle, the bale wagon apparatus 74 includes means for retrieving, handling, transporting and sheathing bales of agricultural product 52. In the description of the present invention, the apparatus 74 is shown in operation with large round bales, but it is herein understood that for all intents and purposes the present invention is not limited thereto. The present invention is adaptable for function with a plurality of bales of different shapes and sizes. Apparatus 74 includes both an attached and a detached mode of operation.

Bale lifting means 65 employs an outwardly extending arm 62. A scoop 64 and a perpendicular rail 66 are attached to arm 62. Scoop 64 and rail 66 are hydraulically lowered by rotation of arm 62, until they are located adjacent the ground. The vehicle then moves the bale wagon apparatus 74 forwardly such that the scoop 64 and rail 66 longitudinally trap a bale resting on the ground. The arm 62 is then rotated about the longitudinal axis of the wagon apparatus 74, thereby lifting the bale so that it falls onto the mobile framework 60.

A mechanism consisting of hydraulic motors 23, a cable 19, and a bale moving device 61 (illustrated in FIG. 7), to be described in detail herein below, then move the bale rearwardly along the mobile framework 60 so as to provide space for the next bale to be loaded thereon. The operation described above is then repeated for each bale that is loaded onto the framework 60. In this way, the wagon apparatus 74 is moved through the fields and loaded with a plurality of bales.

In the presence of a plurality of bales 52, the wagon apparatus 74 proceeds to an area suitable for the storage of bales. At this location, the mobile framework 60 will proceed to be connected with a bale bagger 45 (shown in FIG. 3). In a preferred embodiment of the present invention, the mobile framework 60 will be tilted for connection with the bale bagger 45. Upon engagement of the mobile framework 60 with the bale bagger 45 the plurality of bales 52 are rearwardly displaced along framework 60 and into an open-ended drum 32 of the bale bagger 45. A corrugation of protective sheath 58 is radially attached to the outer surface of the open-ended drum 32. Apparatus 74 proceeds in a forward direction and the protective sheath 58 is extended from the outer surface of the open-ended drum 32 to receive bales 52 as they are displaced rearwardly from framework 60. This forward extension of the protective sheath 58 in time with the rearward displacement of the bales 52 prevents the tearing and snagging of the sheath 58 which is routinely caused by dragging along the ground surface.

Figure 3:
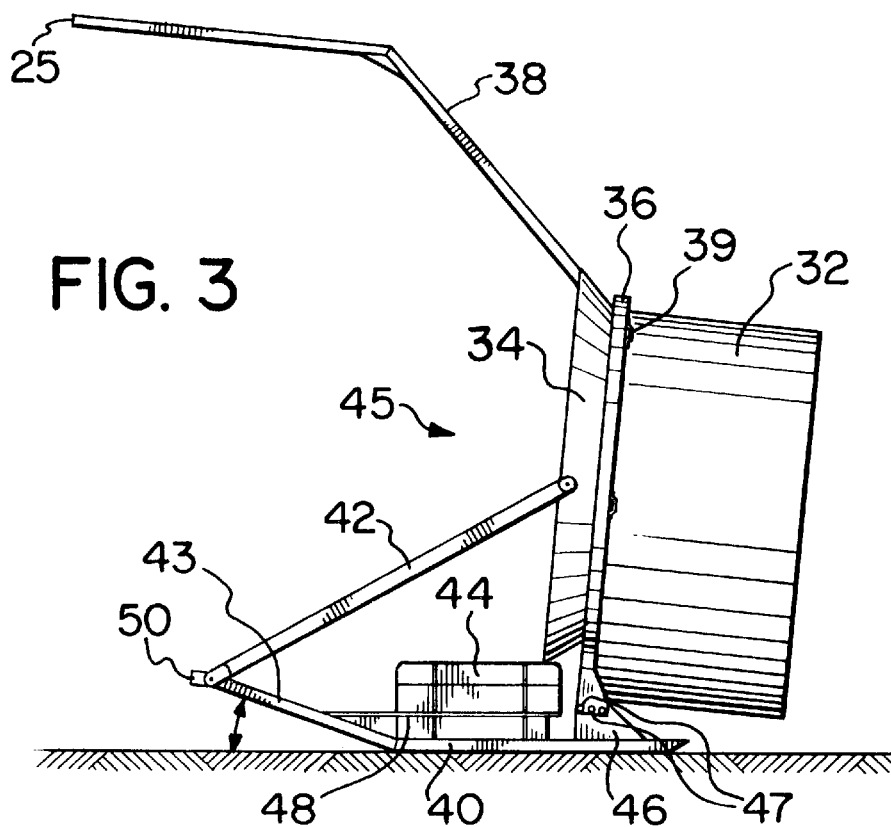
FIG. 3 is a side view of the bale bagger portion of the embodiment shown in FIG. 1 in the detached mode.

Now referring to FIG. 3, the bale bagger 45, in a preferred mode, is supported in a stationary engaging position, by a pair of parallel skids 40. Angled support rails 43 project forwardly from said parallel skids 40 at a preferred angle of 20 degrees. A horizontal member 50 (shown in top view in FIG. 4) joins parallel skids 40 at a location along support rails 43. A pair of positioning wings 44 angularly projecting from skids 40 provide a ledge 48 in horizontal communication with angled support rails 43. A second pair of support rails 42 extend upwardly and rearwardly from said location, abutting each end of horizontal member 50, to parallel regions along a drum flange 34.

A securing rim 36, adjacent to drum flange 34 projects over open-ended drum 32 with fastening hoops 39 positioned along its circumference. Securing rim 36 radially attaches the corrugation of protective sheath 58 to the open-ended drum 32. A tensor ring 54 including tying means 56 extending and fastening to said fastening hoops 39 (shown in FIGS. 8 & 9), secures the protective sheath along the circumference of the open-ended drum 32. A projecting member 38 extends upwardly and forwardly from the upper most region of drum flange 34. A first alignment indicator 25 appears on the foremost surface of projecting member 38.

Figure 4:
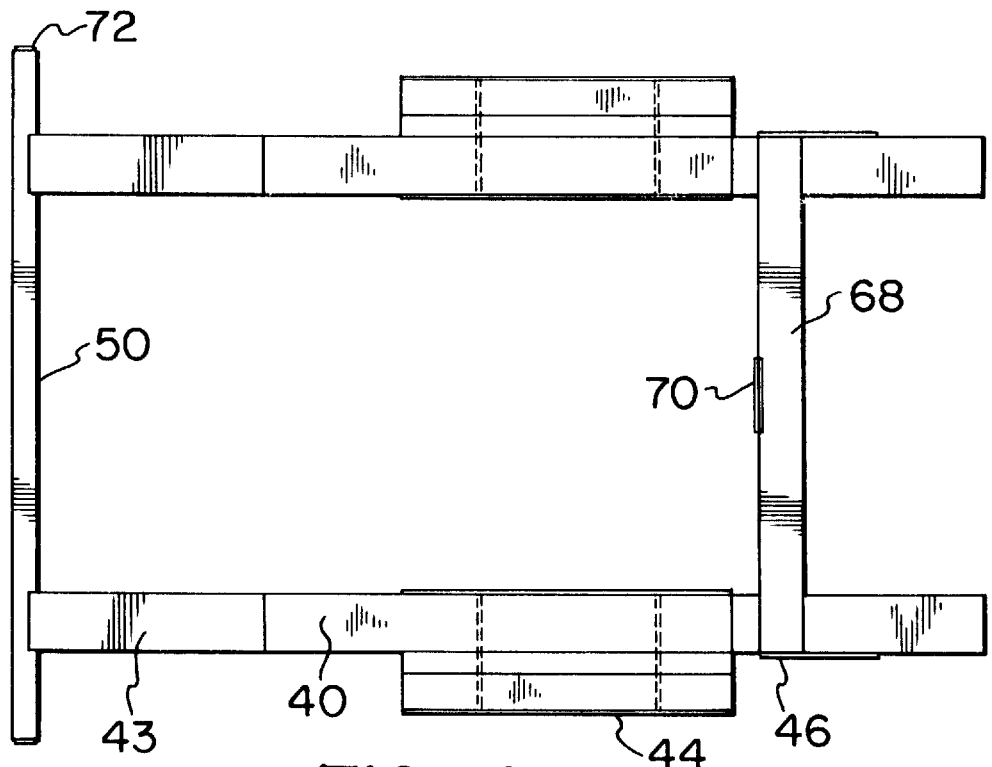
FIG. 4 is a top view of the frame of the bale bagger portion shown in FIG. 3.

As shown in top view in FIG. 4, a support beam 68 runs perpendicular to positioning skids 40 and attaches thereto by a pair of vertical extension plates 46. A securing surface 70 is centrally located along support beam 68. Together with vertical extension plates 46, securing surface 70 attaches open-ended drum 32 to parallel skids 40 by a fastening means 47.

Figure 6:
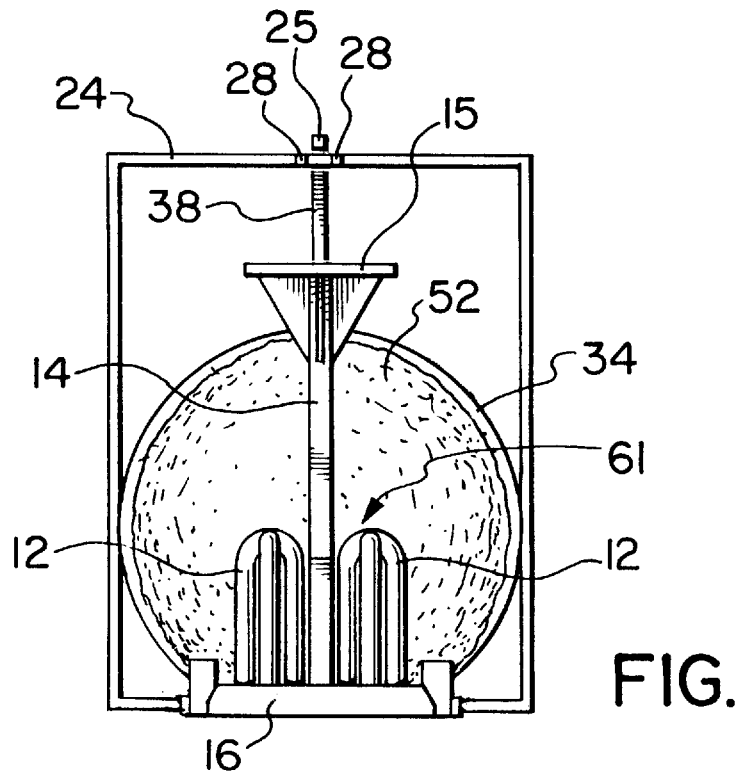
FIG. 6 is a front view of the embodiment of FIG. 1 in operation with a plurality of bales.
Figure 5:
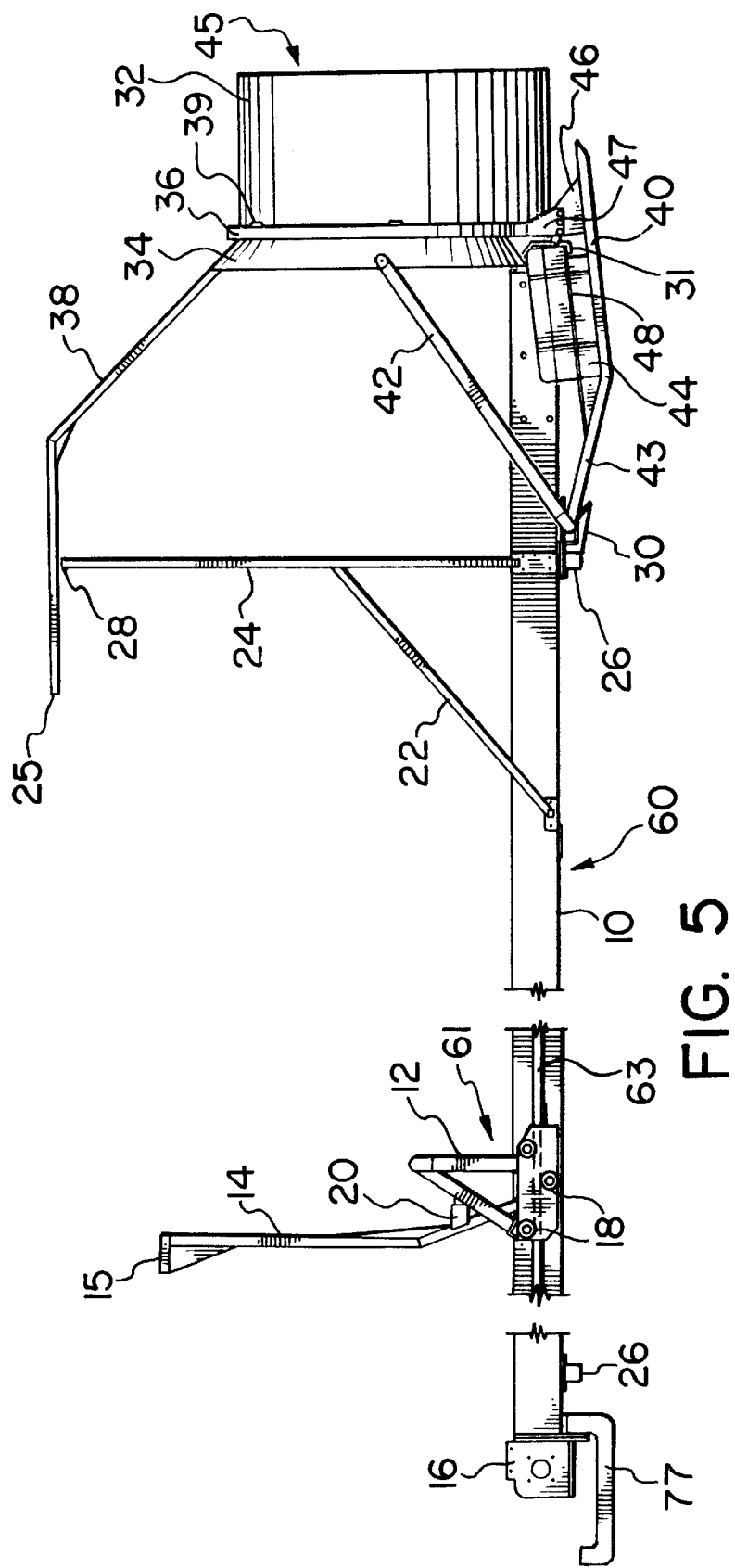
FIG. 5 is a partial side perspective of the embodiment of FIG. 1 in an upright position.

With reference to FIGS. 5 & 6, a square vertical framework 24 is supported across parallel rails 10 by support beams 22. A pair of second alignment indicators 28 are centrally located along the top of vertical framework 24 in a forward orientation. Bales 52 pass through said square vertical framework 24 as they are rearwardly displaced along parallel rails 10.

Figure 7:
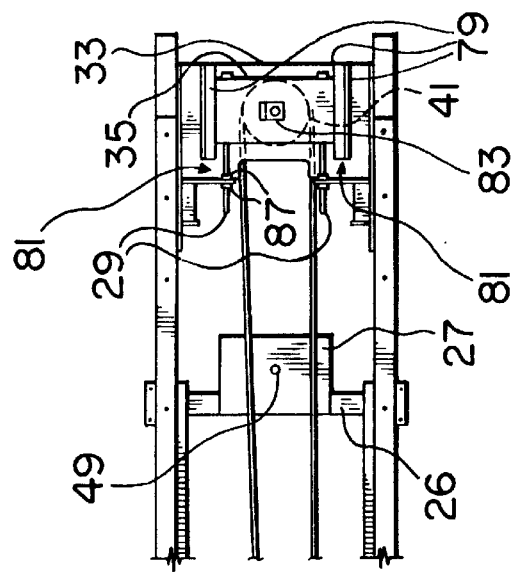
FIG. 7 is a partial view of the frame of the embodiment.
Figure 7:
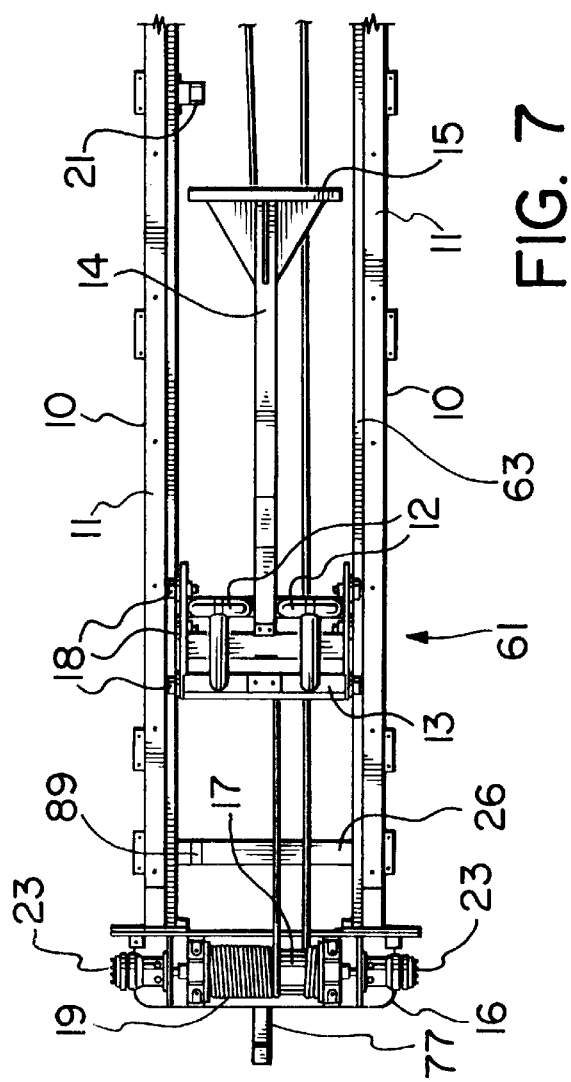

Now referring to FIG. 7, a bale moving device 61 is movably connected to parallel rails 10 by rotating members 18. Inner tracks 63 of parallel rails 10 receive rotating members 18 and allow said bale pushing device 61 to move longitudinally along the framework 60. Cable 19, in connection at opposite ends with a winch 17 and a pulley unit 41, extends longitudinally below the inner track 63 of the parallel rails 10 and guides bale moving device 61 forward and backward there between. A pair of pushing members 12 located on said bale moving device 61 contact loaded bales 52 and rearwardly displace them a distance along parallel rails 10.

A shelving member 33 is posteriorly located between parallel rails 10. A set of rectangular members 79 are dually mounted in a displaced fashion such that a pair of parallel grooves 81 are formed along shelving member 33. An elliptical aperture (not shown) is centrally located between said parallel grooves 81. A framing unit 35 for movable connection with shelving member 33 comprises an upper and a lower plate which house the pulley unit 41. Each plate contains a corresponding circular aperture. In connection with shelving member 33, the lower plate of framing unit 35 slides into parallel grooves 81, along its outer edges. The pulley unit 41 is attached between the upper and lower plates of framing unit 35. The pulley unit 41 is connected for rotation by bolt 83 which extends through the circular apertures and rests in the elliptical aperture of shelving member 33. A pair of jacking bolts 29 are connected to the framing unit 35 and pass through apertures in lips connected to shelving member 33. Adjusting nuts 87 located on jacking bolts 29 capture the lips. Adjustment of these nuts 87 moves the pulley unit 41 with respect to the shelving member 33 and thereby adjusts the tension of cable 19.

A winch casing 16 houses winch 17 in communication with external motors 23. External motors 23 convey cable 19 between winch 17 and pulley unit 41, thus directing the bale moving device 61 along inner tracks 63 of the parallel rails 10. A tripping element 21 protrudes inwardly from a distal portion of an inner track 63. A positioning lever 89 extends upwardly from the most anterior cross member 26.

As shown in FIGS. 5, 6 & 7, a preferred but not essential embodiment of said bale moving device 61 includes an extending arm 14 pivotally connected thereto. A ram 15 is distally located along said extending arm 14 and provides a flat surface for communicating with bales 52. In the event that an operator returns to a location with a plurality of bales contained on the mobile framework 60 to be connected with the bale bagger 45, a preferred mechanism exists whereby unit to unit alignment and attachment is achieved. The mobile framework 60 is aligned with the bale bagger 45 according to indicators 28 and 25. More specifically, as illustrated in FIG. 6, framework 60 should be positioned according to the stationary bale bagger 45 in such a manner that the indicators 28 of the vertical framework 24 are juxtaposed each side of the indicator 25 on the foremost surface of the extended member 38. In this regard, when unit to unit attachment is desired, the mobile framework 60 should approach bale bagger 45 in a reverse orientation according to the positioning of said indicators 25 and 28. The alignment of indicators 25 and 28 provide the operator of the bale wagon apparatus 74 with a visual reference for aligning mobile framework 60, containing a plurality of large bales 52, with a stationary bale bagger 45.

In a preferred embodiment of the present invention, the mobile framework 60 will be tilted by a tilting means contained on a vehicle, to an angle compatible with that of the angled support rails 43 of the bale bagger 45. By aligning the units in the manner detailed above, a first and a second attachment means of the mobile framework 60 and the bale bagger 45 are brought into contact.

Figure 2:
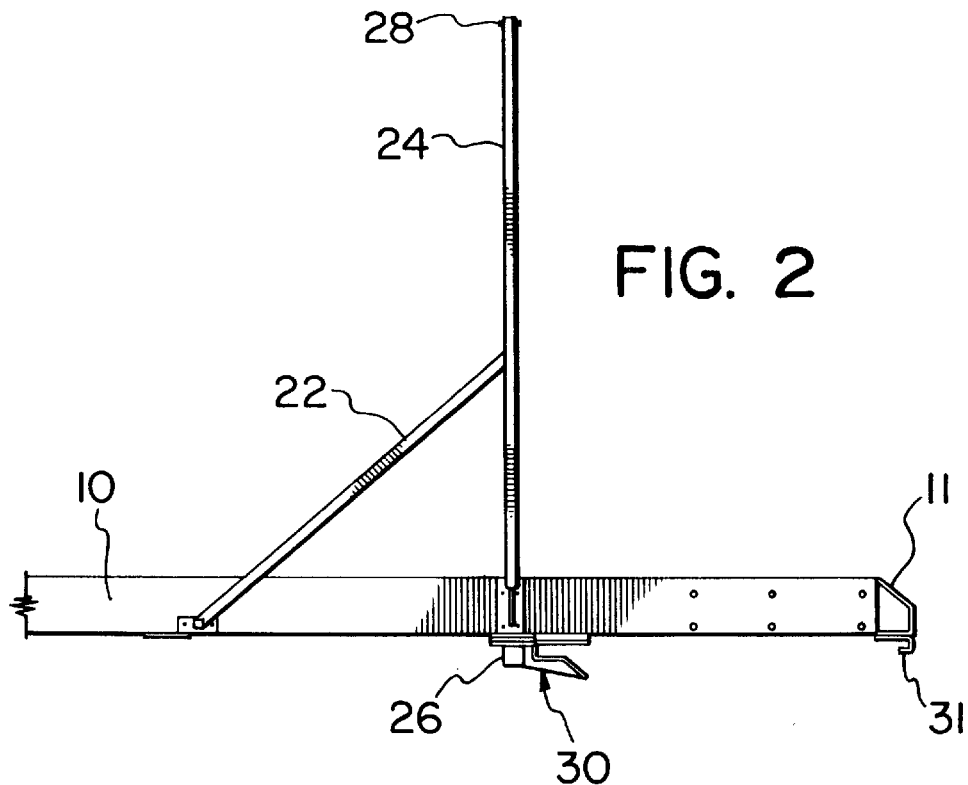
FIG. 2 is a partial side view of a portion the embodiment of FIG. 1.

As illustrated in FIG. 2, a pair of receiving units 30 are located at opposite ends of the most rearwardly located cross member 26. Sloped extensions 11 posteriorly extend from each parallel rail 10. A j-hook 31 extends from the underside of each extension 11. Together, said receiving units 30 and j-hooks 31 comprise said first attachment means. In the case where unit to unit alignment is achieved, the horizontal member 50 of the bale bagger 45 is guided into engagement with receiving units 30 by positioning wings 44. As a result, j-hooks 31 are positioned proximate ledges 48 of the positioning wings 44. As the apparatus 74 is subsequently drawn forward so as to extend the corrugation of protective sheath 58 in the event of sheathing bales 52, j-hooks 31 catch ledges 48 and retain said bale bagger 45 in connection with said mobile framework 60.

In the context described hereinabove, said horizontal member 50 together with ledges 48 comprise said second attachment means. Horizontal member 50 and ledges 48 engage with receiving units 30 and j-hooks 31 respectively, to position said bale bagger 45 in operable connection with mobile framework 60. In this configuration, as illustrated in FIGS. 1, 8 & 9, a bale bagger 45, supporting a corrugation of protective sheath 58 along the circumference of its open-ended drum 32, is attached to a mobile framework 60, supporting a plurality of bales 52.

During the operation of bale wagon apparatus 74, bales 52 are positioned end-to-end along parallel rails 10. Pushing members 12, movably connected thereto, are positioned flush against the end of the nearest bale as shown in FIG. 1. As winch 17 is rotated by motors 23, cable 19 directs bale moving device 61 along inner tracks 63. Accordingly, pushing members 12 force bales 52 along framework 60 and into communication with drum flange 34. As illustrated in FIG. 7, plastic rims 11 are attached along the uppermost surface and inner edges of rails 10 to provide a slidable surface for communication with the bales 52. Apparatus 74, simultaneously proceeds in a forward direction so as to allow bales 52 to be pushed through the open-ended drum 32 and received into the protective sheath 58.

Figure 8:
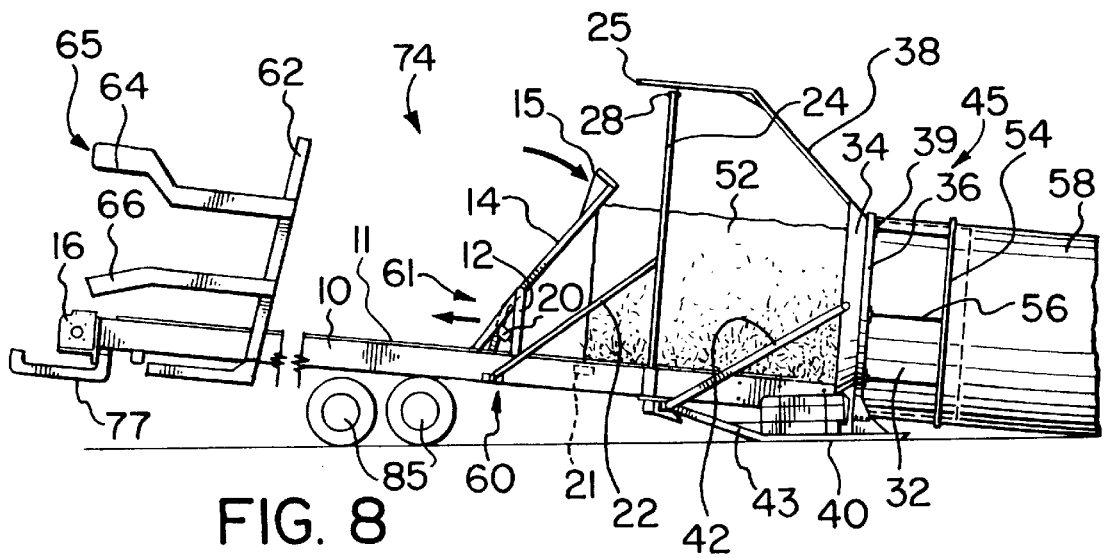
FIGS. 8 & 9 are partial side views of the embodiment and showing a portion of the operation of the invention.
Figure 9:
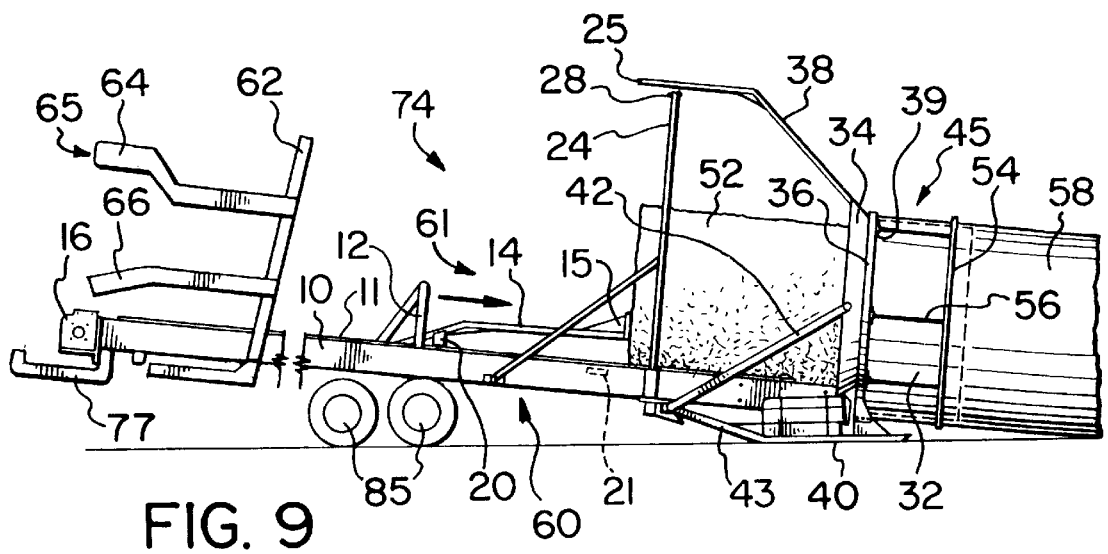

Now we refer to a preferred embodiment of the present invention, as illustrated in FIGS. 8 and 9. Upon displacing all but one bale 52 through the open-ended drum 32, extending arm 14 is tripped from its vertical position (as shown in FIG. 1) by tripping element 21 to rest atop the last bale 52. Under this circumstance, bale moving device 61 is arrested along inner tracks 63. The vehicle is halted so as to position the bale wagon apparatus 74 in a stationary position and external motors 23 are instructed to reverse the rotation of winch 17. Cable 19 propels bale moving device 61 backward along parallel rails 10 so as to allow the extending arm 14 to be longitudinally extended behind said last bale 52 (as illustrated in FIGS. 8 & 9). In this position, a ram 15 is brought into parallel communication with the end of the last bale 52. A stopper 20 contacts bale moving device 61 and supports the parallel positioning of ram 15. The rotation of winch 17 is again reversed and the bale moving device 61 proceeds forwardly along parallel rails 10 so as to push the extending arm 14 against the last bale 52. In time with the procession of the bale moving device 61, the vehicle continues to proceed forward thereby extending the corrugation of protective sheath 58 a distance to accept the last bale 52.

Bale moving device 61 continues along inner tracks 63 and the last bale 52 is displaced through open-ended drum 32 and into protective sheath 58 by way of extending arm 14. Upon displacing the last bale, the bale moving device 61 is retracted to an anterior location between said parallel rails 10. Positioning lever 89, extending upwardly from cross member 26, tilts the extending arm 14 to its vertical position and the bale wagon apparatus 74 returns to an operable mode for accepting bales.

Upon displacing an entire load of bales 52 into plastic tubing 58, apparatus 74 is reversed slightly, disengaging j-hooks 31 from ledges 48. As mobile framework 60 slowly re-orients itself in an angled forward direction, the horizontal member 50 of the bale bagger 45 is disengaged from the receiving units 30 of the mobile framework 60. In this manner, the mobile framework 60 is detached from the bale bagger 45 and can return to the field to retrieve another load. In the event that the mobile framework 60 is in tiltable connection with the vehicle, the horizontal member 50 would disengage from the receiving units 30 as the framework 60 was tilted to an upright position and the apparatus 74 proceeded forwardly.

Upon detachment, bale bagger 45 remains independently positioned on parallel skids 40 with open-ended drum 32 supporting a corrugation of protective sheath 58 with a plurality of bales 52 contained therein.

In the case where an anaerobic storage environment is preferred, the protective sheath containing a plurality of bales can be sealed except for an opening sufficient to introduce an air-vacuum. Air vacuums are known in the art and can effectively remove the air contained within the sheathing. Upon removing the air, the protective sheathing is stringently sealed and an anaerobic environment effective for the production of high quality forage is therein provided.

In the event that it is preferred to transport the bale wagon apparatus 74, including an attached bale bagger 45, a fastening pin is inserted into an aperture 49 on a securing platform 27 (shown in FIG. 7), so as to ensure that the horizontal member 50 of the bale bagger 45 is retained by the receiving units 30 of mobile framework 60. As illustrated in FIG. 5, apparatus 74 is preferably transported in an upright position wherein bale bagger 45 is secured as described above, such that j-hooks 31 support ledges 48 and parallel skids 40 are elevated off of the ground.

What is claimed is:

1. An apparatus for loading bales of agricultural products into a protective sheath; said apparatus comprising:
   (i) a mobile framework for supporting a plurality of agricultural bales including:
      (a) a lifting means for loading bales onto said mobile framework;
      (b) a bale moving means movably connected to said mobile framework for moving bales along said framework; and
      (c) a first attachment means; and
   (ii) a bale bagger comprising:
      (a) an open-ended drum adapted to support a corrugated protective sheath along its circumference;
      (b) a frame adapted to support said open-ended drum including a ground engaging means for holding said bale bagger in an engaging position; and
      (c) a second attachment means compatible with the first attachment means;
   wherein said mobile framework is removably connected at one end with said bale bagger by said first and second attachment means and at an opposite end with a vehicle; wherein bales are loaded onto said mobile framework by said lifting means while said mobile framework is not connected to said bale bagger, and said plurality of bales supported on said mobile framework are displaced rearwardly along said mobile framework and through said open-ended drum into said protective sheath by said bale moving means while said mobile framework is connected to said bail bagger and as the apparatus is pulled forwardly by said vehicle.

2. The apparatus according to claim 1, further including:
   (i) a first indicator means located on the bale bagger; and
   (ii) a second indicator means located on said mobile framework;
   wherein the alignment of said first and second indicator means with one another, by movement of the mobile framework, also aligns said first attachment means with said second attachment means for connection of said mobile framework to said bale bagger.

3. The apparatus according to claim 2, wherein said first indicator means is an extending member projecting upwardly and forwardly from said open ended drum; and said second indicator means is a vertical framework supported in an upright position alone said mobile framework; wherein said first attachment means of said mobile framework and said second attachment means of said bale bagger are aligned for connection when said extending member is centrally positioned about said vertical framework.

4. The apparatus according to claim 3, wherein said second indicator means further includes at least two adjacent spaced apart indicators centrally located on said vertical framework; and wherein said mobile framework and said bale bagger are aligned when said extending member is located between said at least two adjacent spaced apart indicators.

5. The apparatus according to claim 1 or 2, wherein said first attachment means includes:
   (i) at least one receiving unit located between opposite ends of the mobile framework; and;
   (ii) at least one hooking element located at said one end of said mobile framework; and
   said second attachment means includes:
      (iii) a horizontal member extending from a leading edge of said bale bagger; and
      (iv) at least one ledge means;

wherein, when said mobile framework is attached to said bale bagger, said first and second attachment means are positioned such that said horizontal member engages said receiving unit, and said at least one hooking element abuts said at least one ledge means.

6. The apparatus according to claim 5, wherein said frame of said bale bagger further comprises at least one angular positioning wing.

7. The apparatus according to claim 6, wherein said frame includes two parallel skids to support said bale bagger.

8. The apparatus according to claim 7, wherein said bale bagger is connected to said mobile framework in a transport position; said apparatus further comprising:
   (i) a securing platform located proximate said receiving unit for accepting a fastening pin through an aperture contained thereon; wherein said horizontal member is securely retained by said receiving unit and said bale bagger is positioned such that said parallel skids are elevated.

9. The apparatus according to claim 1, wherein said mobile framework is tiltablely connected to said vehicle.

10. The apparatus according to claim 1, wherein said bale moving means is movably connected to said mobile framework, and includes:
   (i) rotating members;
   (ii) a pair of tracks receiving said rotating members;
   (iii) a winch, located proximate said opposite end, connected to at least one external hydraulic motor;
   (iv) a pulley unit, located proximate said one end;
   (v) a cable movably connected to said winch and said pulley unit; and
   (vi) a bale moving ram connected to said cable and said rotating members;
   wherein said at least one hydraulic motor turns the winch and moves said bale moving ram along said pair of tracks.

11. The apparatus according to claim 10, wherein said bale moving means includes a pivotally extending arm.

12. The apparatus of claim 11, wherein a first arm tripping means connected to said mobile framework moves said pivotally extending arm from a first position to a second position.

13. The apparatus of claim 12, wherein a second arm tripping means connected to said mobile framework returns said pivotally extending arm from said second position to said first position.

* * * * *